March 12, 1935.     H. BÖHM     1,993,914
DEVICE FOR REGULATING THE VOLTAGE IN ALTERNATING CURRENT LINES
Filed Feb. 9, 1933
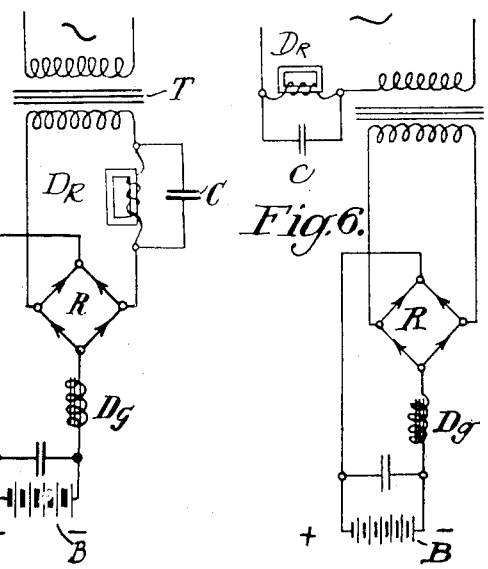
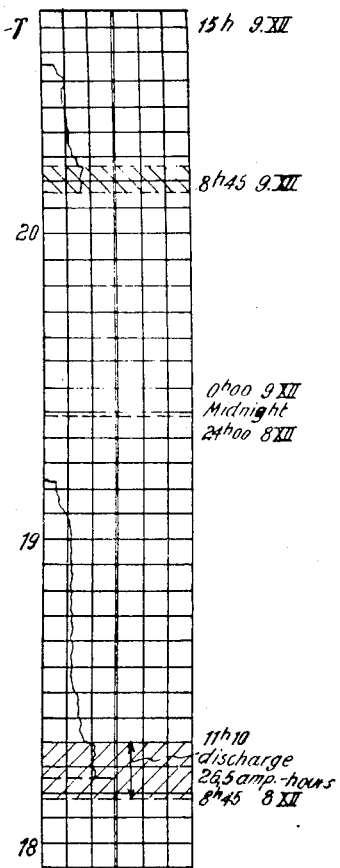
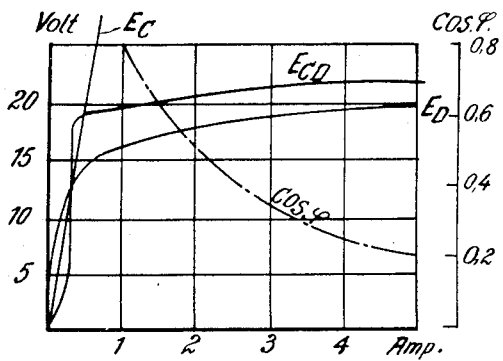
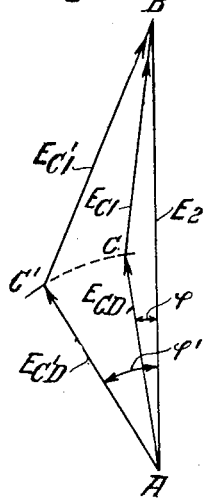
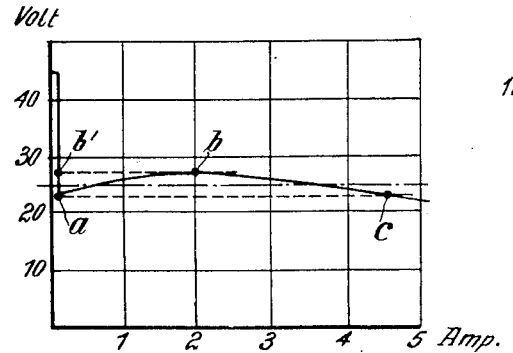
INVENTOR
Helmut Böhm
BY H. B. Willson &co
ATTORNEYS Patented Mar. 12, 1935

1,993,914

UNITED STATES PATENT OFFICE 1,993,914

DEVICE FOR REGULATING THE VOLTAGE IN ALTERNATING CURRENT LINES

Helmut Böhm, Berlin-Friedrichshagen, Germany, assignor to Westinghouse Cooper Hewitt Gesellschaft m. b. H., Berlin, Germany Application February 9, 1933, Serial No. 656,018
In Germany February 10, 1932

6 Claims. (Cl. 171—314)

This invention relates to alternating current supply and more particularly to a device for avoiding in alternating current supply lines the drop of voltage taking place when a load is switched on, for instance in connection with charging storage batteries from an alternating current source by means of rectifiers.

In permanent charging devices by means of rectifiers, particularly dry rectifiers, it has been rendered possible to attain a permanent automatic charge by reducing the internal resistance, so that, after the attainment of a certain cell voltage, e. g. 2.7 volts, a voltage equilibrium will be created. In connection herewith the charging current recedes to about 10 to 15% of its initial value, for the simple reason that it will be possible only in very few cases to attain equilibrium of voltage already at a voltage of 2.7 volts and because, on the other hand, the cell voltage rises merely to 2.5 volts in connection with the feeble charging currents.

Even though this modus of battery charging avoids the employment of any kind of switch contacts for the purpose of regulating the charging current, there is still quite a number of technical drawbacks revealing themselves under practical working conditions. The accentuated rise of voltage of the battery very frequently proves a disturbing factor, particularly in such cases, where it concerns the feeding of sensitive telephone installations. Moreover, the amount of time required for the additional charge is, relatively speaking, rather considerable and may possibly extend over several days, if the battery is exhausted, because the charging current very strongly diminishes within a very short period in consequence of the rise of cell voltage. In contra-distinction thereto it should be demanded, in connection therewith, especially in conjunction with emergency batteries, that after a discharge an energetic re-charge is effected, so that the battery is immediately rendered available again for practical purposes.

A further drawback is represented by the high minimal charging current of 15% which may be instrumental in bringing about a too strong overcharge, particularly in connection with alkaline batteries. It has already been pointed out in the foregoing that it is attempted, as far as possible, to attain an equilibrium of voltage between rectifier and battery which, however, is impossible of attainment under practical working conditions owing to the ripple of the continuous current produced. In connecting a smoothing choke the charging current also cannot be reduced to zero, because an ordinary coil of a smoothing choke augments the internal resistance of the rectifier, so to speak and thus does not correspond fully to the demand specified above.

It is for that reason that the applicant has developed a connection with a special choke affecting the regulation of the charging current like a highly sensitive relay, possessing, in addition thereto, no parts subject to wear.

My invention will be more fully explained hereinafter with reference to the accompanying drawing, in which Fig. 1 shows a diagram of connections in an alternating current circuit comprising a combination of a choke-coil and a condenser according to my invention and a full-wave rectifier rectifying the alternating current.

Fig. 2 shows a curve-diagram representing the voltage and phase characteristics of the condenser and of the choke-coil alone and of the combination of both.

Fig. 3 shows in a vector-diagram the voltage-characteristics for two different loads on the alternating current side of the rectifier.

Fig. 4 shows in a curve-diagram the dependence of the voltage on the load-current-curve on the direct-current-side, and Fig. 5 is a copy of a recording strip taken on a device for charging storage batteries by means of a connection according to Fig. 1.

Fig. 6 shows a modification of the invention, in which the choke coil and condenser combination is placed on the primary side of the transformer.

The connection of such a device is shown in Fig. 1. The regulation of the charging current is essentially effected by means of a choking coil $D_R$ with a highly saturated iron core with condenser C connected in parallel which, if for instance a dry rectifier R with smoothing coil $D_G$ is used, is preferably located between the rectifier R and the transformer T. For the purpose of better understanding the somewhat complicated phenomena, the conditions of current and voltage prevailing at the choke $D_R$ in accordance with Fig. 2 should be observed.

The voltage curve $E_D$ of the inductance $D_R$ is identical with the magnetizing curve of the iron core rising, in the first instance, rapidly, and quite gradually subsequently, whilst the voltage curve $E_C$ of the condenser is represented by a straight line. At the point of intersection of both curves resonance prevails, which means, that the circuit at this point behaves almost like an ohmic resistance: cos. φ therefore, equals 1 and current and voltage are in phase. If the condenser is connected with the choke in parallel, the voltage curve E_CD, which is the voltage curve of the combination of condenser and choke-coil, measured for itself will remain comparatively constant over the whole range of load. The cos. φ on the other hand, permanently diminishes with increasing load, in view of the fact, that the load conditions are removed more and more from the point of resonance. By means of appropriate constructional conditions it may be attained that the bend in the voltage curve E_CD is very far displaced to the left which, as will be shown later, is a matter of extreme importance in connection with the regulation of the charging current. Fig. 3 represents the voltage diagram of the alternating current side of the rectifier, in which point C stands for small loads, the point C', however, for big loads. In this figure the point C and thus the triangle A B C are correspondent to the point of the line E_CD of Fig. 2, which lies at 0,5 amp., and the point C' (triangle A B C') to the point of the curve E_CD, which lies at 5 amp. The vector AB is the terminal voltage of the secondary coil of the transformer T, the two vectors E_CD and E_CD of Fig. 3 correspond to the voltage values of Fig. 2 and curve E_CD for 5 or 0,5 amp. respectively. Both Figs. 2 and 3 are drawn up on the basis of practical measures, but only executed schematically. If different load currents are taken from the rectifier on the continuous current side, e. g. by means of a regulating resistance, the voltage vector AC will change its position of phase in relation to AB, because cos. φ permanently decreases in conjunction with increasing current, i. e. the phase displacement increases. In accordance with Fig. 2 this voltage vector AC (indicated thereby the characterizing letters E_CD) is almost constant, so that the point C passes to C' along an arc of a circle. The transformer voltage AB is constant. The voltage prevailing at the rectifier on the alternating current side is represented by the vector CB. In view of the fact that C now gradually wanders to C', it is obvious that the alternating voltage increases with increasing load, which causes the internal drop in voltage of the rectifier to be compensated. It is a matter of course that this property may also be utilized in cases of load other than those brought about by rectifiers. For instance, the choke connection according to the invention may also be used for the purpose of compensating the internal drop in voltage in a network of cables with increasing load.

Recapitulating, it should be pointed out once more, that it will be possible, with the aid of this choke connection, to effect in an alternating current consumer line an increase in voltage in conjunction with increasing load, whereas otherwise the reverse will be the case. For instance, loading a transformer by means of a resistance will cause a drop in voltage, which also applies to the discharge of current from a public alternating current network.

Fig. 4 represents the continuous current curve of such a rectifier. The curve of the D. C. voltage corresponds to the voltage curve E_CD of the choke-condenser-combination in Fig. 2, but it shows reversed or complemental values for the voltage and the current, because the D. C. voltage is the difference between the constant terminal voltage of the secondary winding of the transformer and the drop of voltage in the choke-condenser-combination with consideration of the phase-displacement cos. φ. Now the effect of the phase-displacement is relatively small with very small currents and it results therefore for the D. C. voltage the curve as shown in Fig. 4, in which the voltage with current intensities of about ⅙ amp. suddenly arises from 23 to about 45 volts, because in the choke-condenser combination the voltage falls suddenly at 0,4 amp. nearly to the small value of 4 volts. The current intensity is then somewhat higher on the A. C. current side than on the D. C. side in consequence of the distorted form of the curve and of the internal consumption of the rectifier, so that therefore 0,4 amp. on the A. C. current side correspond to ⅙ amp. on the D. C. current side. The figure shows that the voltage curve at about 30% of full load exhibits a pronounced maximum. That is due to the fact, that the ohmic voltage-drop of the rectifier, which is small with small currents and is increasing with greater currents, is used for varying the voltage-curve of the rectified current. Up to 30% of full load the voltage on the load is increasing essentially owing to the effect of the choke-condenser-combination, and within this range of load the ohmic voltage-drop of the rectifier plays a secondary part. On the contrary above this point (30% of full load) the increase of voltage due to the condenser-choke combination rises only in an unimportant degree, but the voltage-drop in the dry-contact-rectifier attains even considerable values and finally, at full load, the influence of the ohmic resistance becomes so great, that it compensates for the entire increase of voltage. The voltage curve behind the rectifier assumes therefore from the point $a$ to the point $c$ of Fig. 4 the bow-shaped form represented in this figure, in which the curve rises from a minimum at greatest output current to a maximum at currents of middle intensity and sinks to the same minimum at smallest output current, but then rises suddenly, without a change of the current intensity, to a maximum value which lies by far above the middle charging voltage. If the rectifier were not present, the curve would not run decreasing from the point $b$ to the point $c$ in Fig. 4, but, correspondent to the alternating current curve E_CD in Fig. 2, nearly parallel to the zero-line of voltage. The curve in Fig. 4 is corresponding to the vectors BC and BC' in Fig. 3, in which the vector BC corresponds to the minimum value of the voltage $a$ in Fig. 4 and the vector BC' to the maximum $b$ in Fig. 4. The vectors CA and C'A, on the other hand, correspond to the course of the curve E_CD in Fig. 2, viz. the vector AC is equal to the value of the voltage in the point 0,5 amp. of the curve and the vector AC' is equal to the value of the voltages between the points 3 to 5 amp. of this curve. In connection herewith the voltage tolerances may be made to move within very narrow limits, with the result that such a dry rectifier yields a voltage which is almost constant. In connection with the charging of a battery the following conditions would be created which, in Fig. 4, refer to a lead battery comprising 12 cells.

With a discharged battery the rectifier will be working with its maximum current (point $c$). If the cell voltage gradually rises, the point of load on the voltage curve will be caused to wander from $c$ to $b$. Point $b$ will be attained approximately after a rise of voltage amounting to 8%; subsequently the charging current suddenly drops to a minimum value of about 1% of the charging current. Two charging current values are, as a matter of fact, possible for the battery voltage, represented in the curve by the points b and b'.

For considering Fig. 4 it is to begin with the point c that is with discharged battery. At normal voltage of the battery, B say of about 23.5 volt, the maximum charging current of 4.5 amp. flows at point c. When now the voltage of the battery rises owing to the increasing state of charging according to the portion c b of the curve, the charging-current sinks gradually to 2 amp.

If now point b is reached, the still flowing charging-current of 2 amp. is tending to increase further the battery voltage; but a higher value of voltage can be reached, according to the voltage curve of the rectifier, only in the point b', and therefore now the charging-current falls suddenly off to a very small value, of about 50 ma, according to the line b'a. Since now in the point b' only the very small charging-current of 50ma is flowing, this current is not sufficient for maintaining the high battery-voltage of about 28 v. and therefore the voltage is sinking, but remains between the points a and b', as this small charging-current holds the battery voltage above the point a.

Now when the discharge begins, the battery voltage still falls off with the still flowing small charging current of 50ma and tends to sink below the point a; but that is not admitted by the voltage curve of the rectifier, because only with greater values of current (in point c) a lower value of the voltage can be reached. Therefore the charging current jumps suddenly to 4.5 amp., that is corresponding to the point c.

The voltage curve thus runs in such a way, that the load point travels through the portion c b of the curve, and then jumps suddenly to the point b'. During this small charging current is running, the point of operation travels over portion b'a of the curve and, when the discharge again begins, suddenly over the section a c.

The switching off and on of the charging current takes place in this arrangement if the network voltage is constant always with the same values. In view of the fact, that the voltage curve displaces itself in proportion to the network voltage, it is obvious that also the points of switching off and switching on will displace themselves in proportion to the line voltage. An increase of the station voltage by 10% would mean that the switching off would take place at 29.4 and the switching on at 27.4 volts. This shows that even with comparatively large fluctuations in the public line current it will be possible to make use of this connection, because a lead battery comprising 12 cells does not acquire its maximum voltage, until attaining 32.3 volts. It will thus be seen that there is a considerable distance before reaching this limit at a 10% rise in voltage of the network.

The fluctuations of voltage, therefore, do not exercise a deleterious effect upon the regulation of the charging current, but, on the contrary, they prove very useful indeed. It is generally known that during the night and on Sundays the voltage of the network of public electricity works is higher than during the other days and hours. For instance the work at automatic telephone exchange commences at 9 o'clock in the morning. Shortly after the commencement of work the cell voltage of the battery will have dropped to such extent, that the rectifier will be switched on. After the cessation of work, i. e. at about 5 o'clock in the afternoon, any kind of discharge of current from the battery will cease. In consideration of the fact that the discharge of current has been very considerable, the rectifier will be charging until about midnight. Whilst with normal voltage of the network the charging action will take place up to about 27 volts, this limit will be raised to about 29.4 volts in consequence of the increase of the network voltage. This will be instrumental in charging the battery, and this is desirable, to a considerably greater extent than would be the case, if the switching off voltage were limited to 27 volts. After switching off, a small current remains which, on the one hand, covers the self-discharge and on the other hand serves for maintaining the battery on its full capacity value. Moreover, after switching off, the battery voltage only recedes to such extent, that a fresh switching is avoided. These conditions are best illustrated in the reproduced record strip, Fig. 5 taken on such a rectifier. The graph of Fig. 5 was traced with an arrangement according to Fig. 1. The battery B was in the beginning of the experiment in a full-charged state and therefore at once the charging current was switched off by the choke-condenser device DR. For starting the action, the 12 cells battery was discharged with a discharge current of about 12 to 15 amp., whereupon the charging started immediately. This moment is represented by the lowest line of Fig. 5 and this was at about 15$^h$ on the 7th December 1932.

Fig. 5 represents the record strip traced over 3 days. On the right edge are indicated the hours of day and the dates (7th December till 9th December), when the apparatus was in operation. The intensity of the charging current is measured on the abscissa from the left vertical line horizontally, the height of a square corresponding to about 1.65 amp. The inscription "5 Amp." indicates the scale. The figures on the left side (17 to 20) are index-numbers originally printed on the strip, for showing the rate of running down of this strip in the recording ammeter.

The shaded portions indicate the discharging times of the battery. The intensity of the discharging current during the three discharges marked was about 12 amp.; this indication is not noted on the graph. The number of the ampere-hours taken is entered on the right side for enabling a comparison between the numbers of the ampere hours taken and charged-in.

Immediately after the discharge made on the 7th December 1932 for about one hour, the charging current automatically switched in and rose to about 4 amperes. The record-line shows clearly, that the charging current initially sank somewhat, and then remained on an average on the value of 2.5 amp. till 21$^h$48, when the automatic switching off by the choke-condenser device was effected.

In the night from 21$^h$48 till the next morning at about 9$^h$ only a very small charging current was flowing, which cannot be seen on the record graph because of its small intensity. At 8$^h$45 again a discharge with 12 amp. for about two hours was made. The charging current started only after one hour, until the battery had reached the switching-in value of the voltage.

After disconnecting the discharge at 11ʰ10, the charging current sank again to about 2.5 amp. and remained on the same value till about 21ʰ, when the switching-off took place. The same series of operations repeated on the next morning, the 9th December 1932, in a similar manner. At 15ʰ the experiment was stopped. The curves show, that the ampere-hours taken by each discharge were again supplemented automatically during the time of charging, so that a fully charged battery with approximately normal voltage is now available for the working of the telephone exchange. During the day the charging is effected only up to about 27 volts, so that any trouble of the automatic telephone exchange in consequence of an excessive voltage will be obviated.

The dry rectifier with this regulating choke is adapted for any kind of battery which allows of a permanent charge and for which a perfectly automatic supervision of the charging current is required. When employing the rectifier without battery it will act almost like a constant source of continuous current voltage.

The foregoing specification refers, in the main, to dry rectifiers, but the invention may also be applied to other rectifiers of whatever description, as has been proved by corresponding experiments. The connection requires then, however, to be modified in accordance with the peculiarity of the rectifier, the fundamental principle of the connection, however, being the same as with the dry rectifiers.

It should be mentioned at the same time that the use of the regulating choke according to the invention with polyphase alternating currents is also possible and in certain circumstances, as, e. g. even by increasing the frequences, which may easily be attained in connection with rectifier connection, will it be possible to reduce the size of the choke. The choke according to the invention, which in Fig. 1 is situated between transformer and rectifier system, may, naturally, also be placed on the primary side of the transformer. Such a connection is shown in Fig. 6 in which same letters of reference are used as in Fig. 1. As shown in this figure the choke coil $D_R$ and the condenser C in parallel thereto are placed in series with the primary winding of the transformer T.

Moreover, the form of the curve of the currents and voltages plays a certain part. It is, for instance, advisable to employ a smoothing choke coil in accordance with Fig. 1, because this suppresses the third harmonic presenting itself in connection with battery charging by means of a rectifier, said harmonic exercising a certain disturbing influence upon the operation of the choke according to the invention.

Special kinds of iron possessing a high initial permeability are best suited for an appropriate construction of the regulating choke. These are obtainable in the trade under many different names, e. g. "Permenorm", that is an iron-nickel alloy with high initial permeability and quick saturation.

It has been mentioned in the foregoing, that smoothing choke coils are not quite dispensable for the proper working of the regulating choke. In Fig. 1 such a smoothing coil is indicated at $D_G$ between an output terminal of the rectifier and the load. This coil may, however, be made to be of so small a size, that no appreciable smoothing of the continuous current will be attained. If, however, for other reasons, the harmonic of the produced continuous current exercises a disturbing effect, there will be nothing to prevent the choke being made so large as to meet requirements, or else to employ smoothing condensers.

It has been found that in rectifiers for operation without batteries, e. g. by using a regulating choke according to the invention for maintaining the constancy of the voltage, that the change over to any other source of continuous current will be desirable in case of failure of the network current. This change over must be effected with the aid of a relay. During the time required by the change over the current consumer would be without current, which would be inadmissible for instance, in connection with sensitive relays. The smoothing device may now be enlarged to such an extent, particularly by increasing the number of condensers, that these represent an instantaneous reserve, furnishing the feeding current during the moment of the change over.

Having now particularly described and ascertained the nature of my said invention, I declare that what I claim is:—

1. In a current circuit comprising an alternating current source and a load, the combination of a condenser and a choke-coil connected in parallel thereto, this combination being connected in series in this circuit, the choke-coil having an iron core, which is saturated at a voltage lying considerably below the voltage of said source, the condenser and the choke-coil individually having such voltage curves, that they are intersecting each other in a point lying at about 20 percent of the full-load current intensity and considerably below the voltage of the source, and the voltage-curve for the entire combination of choke-coil and condenser forming a sharp bend, which lies a little above the voltage in the said intersecting point, and the curve behind this bend running substantially parallel to the voltage zero-line, and the load-current remaining within the range of this portion of the voltage line, so that on very small loads the phase-displacement caused by the choke coil-condenser combination is approximately zero and increases considerably on raising load, but the voltage-drop at the choke-coil-condenser combination remains nearly constant over the entire range of load and therefore the consumption voltage as a resultant of the constant voltage of the mains and the nearly constant choke-condenser voltage increases considerably due to the phase displacement.

2. In a current circuit comprising an alternating current source and a load, the combination of a condenser and a choke-coil connected in parallel thereto, this combination being connected in series in this circuit, the choke-coil having an iron core, which is saturated at a voltage lying considerably below the voltage of said source, the condenser and the choke-coil individually having such voltage curves, that they are intersecting each other in a point lying at about 20 percent of the full-load current intensity and considerably below the voltage of the source, and the voltage-curve for the entire combination of choke-coil and condenser forming a sharp bend, which lies a little above the voltage in the said intersecting point, and the curve behind this bend running substantially parallel to the voltage zero-line, and the load-current remaining within the range of this portion of the voltage line, so that on very small loads the phase-displacement caused by the choke coil-condenser combination is approximately zero and is increasing considerably on raising load, but the voltage-drop at the choke-coil-condenser combination remains nearly constant over the entire range of load and therefore the consumption voltage as a resultant of the constant voltage of the mains and the nearly constant choke-condenser voltage increases considerably due to the phase displacement, the said iron core consisting of a special sheet iron possessing the highest possible initial permeability and low amount of loss.

3. A device for automatically permanently charging storage batteries, comprising an alternating current source, a rectifier, a choke coil, a condenser connected in parallel to said choke coil, the choke coil being connected in series with the said current source and the said rectifier and a storage battery connected in series to said rectifier, the constants of said coil and said condenser being of a value that the input voltage of the rectifier increases with rising alternating current supplied and the rectifier having a drop of voltage rising with increase of current.

4. In a current circuit comprising an alternating current source and a load, the combination of a condenser and a choke-coil connected in parallel thereto, this combination being connected in series in this circuit, the choke-coil having an iron core, which is saturated at a voltage lying considerably below the voltage of said source, the condenser and the choke-coil individually having such voltage curves, that they are intersecting each other in a point lying at about 20 percent of the full-load current intensity and considerably below the voltage of the source, and the voltage-curve for the entire combination of choke-coil and condenser forming a sharp bend, which lies a little above the voltage in the said intersecting point, and the curve behind this bend running substantially parallel to the voltage zero-line, and the load-current remaining within the range of this portion of the voltage line, so that on very small loads the phase-displacement caused by the choke coil-condenser combination is approximately zero and is increasing considerably on raising load, but the voltage-drop at the choke-coil-condenser combination remains nearly constant over the entire range of load and therefore the consumption voltage as a resultant of the constant voltage of the mains and the nearly constant choke-condenser voltage increases considerably due to the phase displacement, said load consisting of a rectifier, which has a drop of voltage rising with increasing current, and of a secondary battery connected to the said rectifier with a smoothing coil connected in series to said rectifier and said battery, so that the voltage curve of the rectified current initially rises from 0 to 30% due to the increasing phase displacement on the alternating current side, and then sinks again, owing to the rising ohmic drop of voltage in the rectifier, this voltage-curve having thus the shape of a bow, in which it rises from a minimum at greatest output current to a maximum at current of middle intensity, and sinks to the same minimum at smallest output current, but then rises suddenly at very small currents, without a change of the current intensity, to a maximum value which lies by far above the middle charging voltage of the battery.

5. In a current circuit comprising a constant alternating current source, a transformer and a load, a combination of a condenser and a choke-coil in parallel thereto being connected on the primary side of said transformer in series with said source and the load lying on the secondary side of the transformer, the choke-coil having an iron core, which is saturated at a voltage lying considerably below the voltage of said source, the condenser and the choke-coil individually having such voltage curves, that they are intersecting each other in a point lying at about 20 percent of the full-load current intensity and considerably below the voltage of the source, and the voltage-curve for the entire combination of choke-coil and condenser forming a sharp bend, which lies a little above the voltage in the said intersecting point, and the curve behind this bend running substantially parallel to the voltage zero-line, and the load-current remaining within the range of this portion of the voltage line, so that on very small loads the phase-displacement caused by the choke coil-condenser combination is approximately zero and is increasing considerably on raising load, but the voltage-drop at the choke-coil-condenser combination remains nearly constant over the entire range of load and therefore the consumption voltage as a resultant of the constant voltage of the mains and the nearly constant choke-condenser voltage increases considerably due to the phase displacement.

6. In a current circuit comprising a constant alternating current source, a line, a rectifying device and a load, the combination of a condenser and a choke-coil connected in parallel thereto, this combination being connected in series in this circuit on the alternating current side, the choke-coil having an iron core, which is saturated at a voltage lying considerably below the voltage of said source, the condenser and the choke-coil individually having such voltage curves, that they are intersecting each other in a point lying at about 20 percent of the full-load current intensity and considerably below the voltage of the source, and the voltage-curve for the entire combination of choke-coil and condenser forming a sharp bend, which lies a little above the voltage in the said intersecting point, and the curve behind this bend running substantially parallel to the voltage-zero-line, and the load-current remaining within the range of this portion of the voltage line, so that on very small loads the phase-displacement caused by the choke coil-condenser combination is approximately zero and is increasing considerably on raising load but the voltage-drop at the choke-coil-condenser combination remains nearly constant over the entire range of load, and the alternating current voltage on the rectifying device as a resultant of the constant voltage of the source and the nearly constant choke-condenser voltage increases in such degree due to the phase displacement, that the entire drop of voltage in said alternating current line and in the rectifying device is compensated, for attaining a nearly constant voltage over a range of load from 0 to 100% in the rectified current.

HELMUT BÖHM.